(12) United States Patent
Sheridan

(10) Patent No.: US 10,378,440 B2
(45) Date of Patent: Aug. 13, 2019

(54) GEARED TURBOFAN WITH IMPROVED GEAR SYSTEM MAINTAINABILITY

(71) Applicant: United Technologies Corporation, Farmington, CT (US)

(72) Inventor: William G. Sheridan, Southington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 354 days.

(21) Appl. No.: 15/105,135

(22) PCT Filed: Nov. 25, 2014

(86) PCT No.: PCT/US2014/067270
§ 371 (c)(1),
(2) Date: Jun. 16, 2016

(87) PCT Pub. No.: WO2015/094607
PCT Pub. Date: Jun. 25, 2015

(65) Prior Publication Data
US 2016/0312696 A1    Oct. 27, 2016

Related U.S. Application Data

(60) Provisional application No. 61/919,162, filed on Dec. 20, 2013.

(51) Int. Cl.
| | |
|---|---|
| *F02C 3/113* | (2006.01) |
| *F01D 25/16* | (2006.01) |
| *F02K 3/06* | (2006.01) |
| *F02C 3/107* | (2006.01) |

(Continued)

(52) U.S. Cl.
CPC .............. *F02C 3/113* (2013.01); *F01D 25/16* (2013.01); *F02C 3/107* (2013.01); *F02C 7/06* (2013.01); *F02C 7/36* (2013.01); *F02K 3/06* (2013.01); *F05D 2220/323* (2013.01);
(Continued)

(58) Field of Classification Search
CPC .... F02C 3/13; F02C 3/107; F02C 7/06; F02C 7/36; F02K 3/06; F01D 25/16
See application file for complete search history.

(56) References Cited

U.S. PATENT DOCUMENTS

| | | | |
|---|---|---|---|
| 3,589,132 | A | 6/1971 | Dupont |
| 4,704,862 | A | 11/1987 | Dennison et al. |

(Continued)

OTHER PUBLICATIONS

International Search Report and Written Opinion for PCT Application No. PCT/US2014/067270 dated Mar. 25, 2015.

(Continued)

*Primary Examiner* — Craig Kim
(74) *Attorney, Agent, or Firm* — Carlson, Gaskey & Olds, P.C.

(57) ABSTRACT

A disclosed gas turbine engine includes a fan section including a hub supporting a plurality of fan blades rotatable about an axis, and a bearing assembly supporting rotation of the hub about the axis. A compressor section is in fluid communication with a combustor and a turbine is in fluid communication with the compressor section. A speed reduction device driven by the turbine section for rotating the fan about the axis is mounted forward of the bearing assembly supporting rotation of the hub.

19 Claims, 5 Drawing Sheets

(51) Int. Cl.
*F02C 7/36* (2006.01)
*F02C 7/06* (2006.01)

(52) U.S. Cl.
CPC ...... *F05D 2230/70* (2013.01); *F05D 2230/72* (2013.01); *F05D 2240/35* (2013.01); *F05D 2260/4031* (2013.01)

(56) References Cited

U.S. PATENT DOCUMENTS

| | | | |
|---|---|---|---|
| 4,934,140 A * | 6/1990 | Dennison | F02C 7/20 |
| | | | 244/54 |
| 6,459,165 B1 | 10/2002 | Schoo | |
| 7,490,460 B2 | 2/2009 | Moniz et al. | |
| 8,276,275 B2 | 10/2012 | Sheridan et al. | |
| 8,360,714 B2 | 1/2013 | Otto et al. | |
| 8,522,522 B2 | 9/2013 | Poisson | |
| 8,572,943 B1 | 11/2013 | Sheridan | |
| 2007/0084185 A1 | 4/2007 | Moniz et al. | |
| 2008/0075590 A1 | 3/2008 | Moniz et al. | |
| 2008/0116010 A1 * | 5/2008 | Portlock | F01D 25/18 |
| | | | 184/6.12 |
| 2008/0120839 A1 | 5/2008 | Schilling | |
| 2010/0032961 A1 | 2/2010 | Numajiri | |
| 2012/0099988 A1 * | 4/2012 | Charier | B64D 35/06 |
| | | | 416/129 |
| 2012/0213628 A1 | 8/2012 | McCune et al. | |
| 2012/0251306 A1 * | 10/2012 | Reinhardt | F01D 25/28 |
| | | | 415/182.1 |
| 2013/0000323 A1 | 1/2013 | Kupratis | |
| 2013/0170958 A1 | 7/2013 | Otto et al. | |
| 2013/0192199 A1 | 8/2013 | Merry et al. | |
| 2013/0319000 A1 | 12/2013 | Otto | |

OTHER PUBLICATIONS

European Search Report for EP Application No. 14872784.5 dated Jul. 18, 2017.
International Preliminary Report on Patentability for PCT Application No. PCT/US2014/067270 dated Jun. 30, 2016.

* cited by examiner

GEARED TURBOFAN WITH IMPROVED GEAR SYSTEM MAINTAINABILITY

CROSS REFERENCE TO RELATED APPLICATION

This application claims priority to U.S. Provisional Application No. 61/919,162 filed on Dec. 20, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Access to the gear assembly is required to facilitate inspection and maintenance. Inspection and maintenance of a turbine engine requires significant time and expense. Accordingly, engine manufactures continually seek methods and configurations that reduce time and expense corresponding to inspection and maintenance.

SUMMARY

A gas turbine engine according to an exemplary embodiment of this disclosure, among other possible things includes a fan section including a hub supporting a plurality of fan blades rotatable about an axis. A bearing assembly supports rotation of the hub about the axis. A gas generator includes a fan drive turbine. A speed reduction device is driven by the fan drive turbine for rotating the fan about the axis. The speed reduction device is mounted forward of the bearing assembly supporting rotation of the hub.

In a further embodiment of any of the foregoing gas turbine engines, the bearing assembly includes an inner race supported by a static structure and an outer race supporting rotation of the hub.

In a further embodiment of any of the foregoing gas turbine engines, the outer race is disposed radially outward of the inner race and the hub is directly supported for rotation on the outer race.

In a further embodiment of any of the foregoing gas turbine engines, includes a rotating gutter disposed radially outside the speed reduction system for collecting lubricant and directing lubricant to a lubricant supply system.

In a further embodiment of any of the foregoing gas turbine engines, the speed reduction device is supported within the hub.

In a further embodiment of any of the foregoing gas turbine engines, the speed reduction system includes a star gear system including a ring gear fixed for rotation with the hub.

In a further embodiment of any of the foregoing gas turbine engines, the star gear system includes a carrier supporting a plurality of intermediate gears fixed to a static engine structure.

In a further embodiment of any of the foregoing gas turbine engines, the speed reduction system includes a planetary gear system including a carrier supporting a plurality of intermediate gears. The carrier is fixed for rotation with the hub.

In a further embodiment of any of the foregoing gas turbine engines, the planetary gear system includes a ring gear circumscribing the intermediate gears. The ring gear is fixed to a static engine structure.

In a further embodiment of any of the foregoing gas turbine engines, the speed reduction system is removable without removal of the fan section.

A method of removing a geared architecture from a gas turbine engine according to an exemplary embodiment of this disclosure, among other possible things includes accessing a geared architecture mounted forward of a bearing assembly at least partially supporting a fan section, decoupling a portion of the geared architecture from a fixed engine structure, and removing the geared architecture in a direction forward of the fan section.

In a further embodiment of any of the foregoing methods, includes decoupling a portion of the geared architecture to the fan section.

In a further embodiment of any of the foregoing methods, the fan section includes a hub. The geared architecture is mounted within the hub and the step of decoupling the geared architecture includes decoupling intermediate gears from a ring gear fixed to the hub.

In a further embodiment of any of the foregoing methods, the fan section includes a hub. The geared architecture is mounted within the hub and decoupling the geared architecture includes decoupling a carrier supporting a plurality of intermediate gears from the fixed engine structure.

In a further embodiment of any of the foregoing methods, the fan section includes a hub. The geared architecture is supported within the hub and decoupling the geared architecture includes decoupling the carrier supporting a plurality of intermediate gears from the hub.

In a further embodiment of any of the foregoing methods, includes decoupling a sun gear of the geared architecture from a shaft.

In a further embodiment of any of the foregoing methods, includes removing a nose cone attached to a hub of the fan section to provide access to the geared architecture.

In a further embodiment of any of the foregoing methods, the fan section includes a hub that remains supported by the bearing assembly upon removal of the geared architecture.

In a further embodiment of any of the foregoing methods, removing of the geared architecture includes moving the geared architecture along the axis forward of the fan section.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
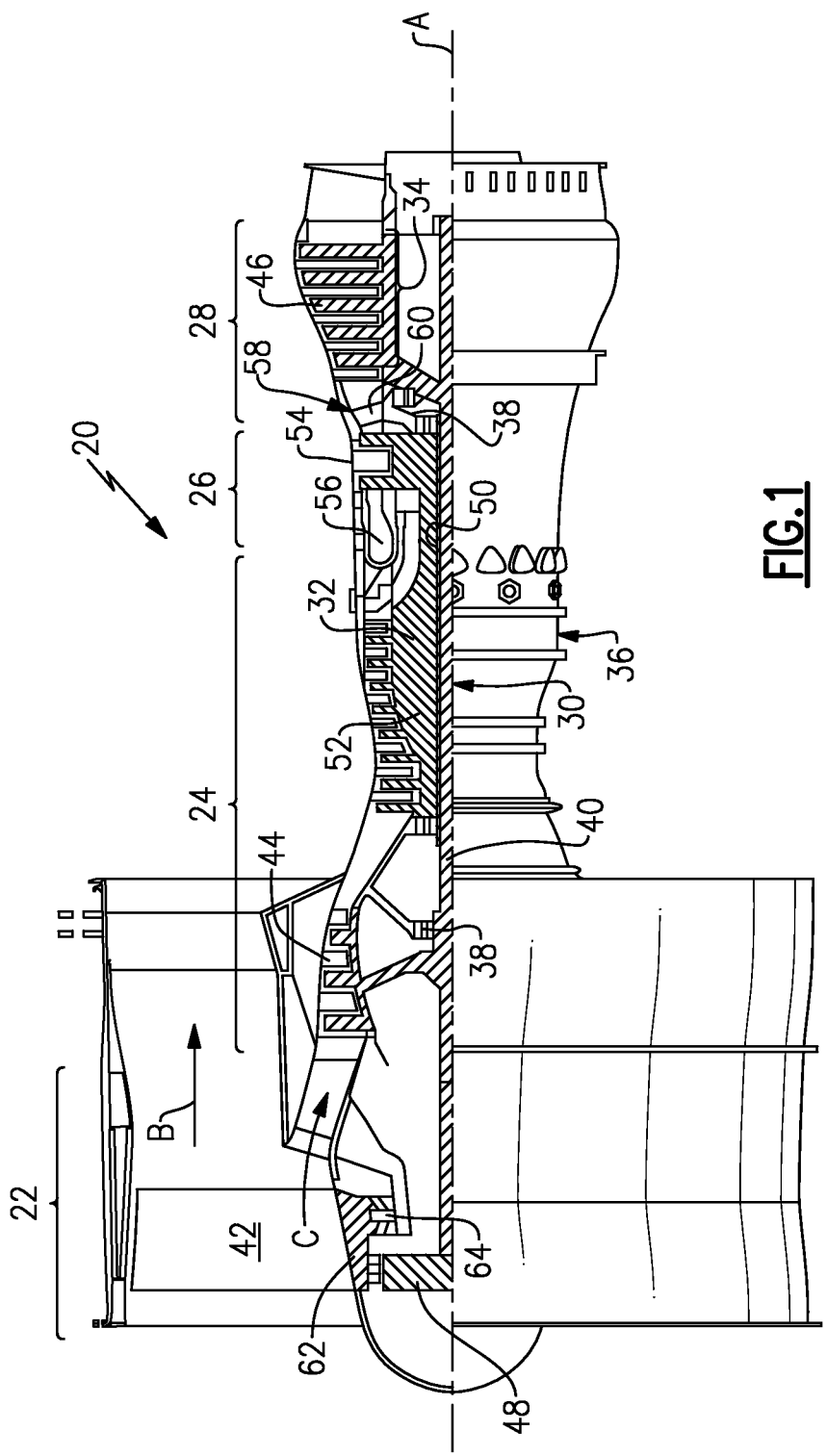
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22 and a gas generator 25. In this example the gas generator 25 includes a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]0.5$. The "Low corrected fan tip speed" as disclosed herein according to one non-limiting embodiment is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 can also be referred to as a fan drive turbine and provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example fan section 22 includes a hub 62 that supports the plurality of fan blades 42. The hub 62 is supported on a bearing assembly 64. The example geared architecture 48 is disposed forward of the bearing assembly 64 to facilitate easy access and removal from the gas turbine engine without removal of the entire fan section 22.

Figure 2:
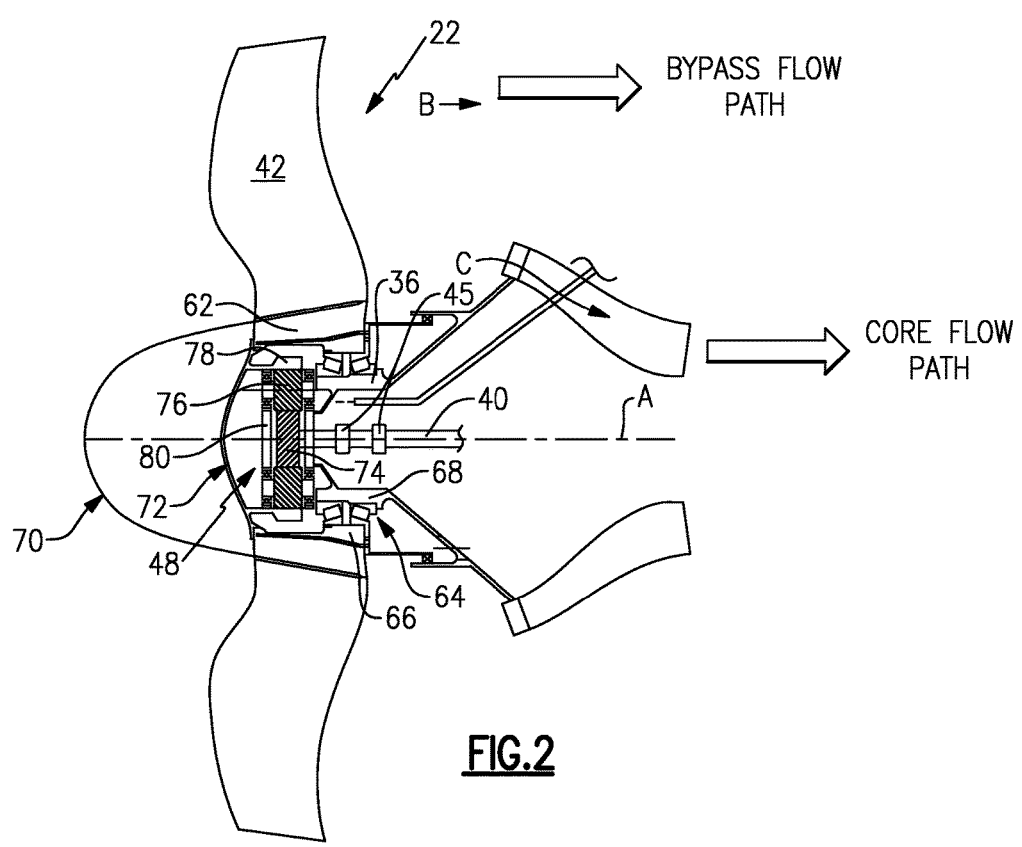
FIG. 2 is a schematic view of a fan section of an example gas turbine engine.

Referring to FIG. 2, with continued reference to FIG. 1, the example fan section 22 includes the geared architecture 48 that is disposed radially within the hub 62 supporting the plurality of fan blades 42. The hub 62 is supported for rotation by bearing assembly 64. The bearing assembly 64 includes an outer race 66 and an inner race 68 that is disposed between roller bearings 65. The outer race 66 may be an integral part portion of the hub 62 or may be attached to the hub 62 to rotate with the hub 62.

The example geared architecture 48 is supported forward of the bearing assembly 64 and includes a sun gear 74 that is driven by the inner shaft 40. The inner shaft 40 includes a flexible portion 45 that is disposed just rearward of the sun gear 74 to provide flexibility to aid alignment of the geared architecture 48.

The example geared architecture 48 is referred to as a star system. In the example geared architecture 48, a sun gear 74 is driven by the shaft 40 and rotates intermediate gear 76 that is supported within a carrier 80. In this example, the carrier 80 is fixed to the engine static structure 36. The plurality of intermediate gears 76 are circumscribed by a ring gear 78. The example ring gear 78 is fixed to the hub 62 to generate rotation of the hub 62 and thereby the plurality of fan blades 42 about the axis A.

The geared architecture 48 is disposed radially inward and axially within the hub 62. The example geared architecture 48 disposed within the hub 62 enables shortening of the engine such that the geared architecture 48 does not create additional axial length in addition to the hub 62. The geared architecture 48 is disposed within the hub and a cover 72 is attached to the hub to cover the geared architecture 48. A nose cone 70 is further attached to the hub to provide the desired aerodynamic flow through the fan section 42. The example hub 62 includes an integral lubricant gutter 82 that collects lubricant exiting the geared architecture 48.

Figure 3:
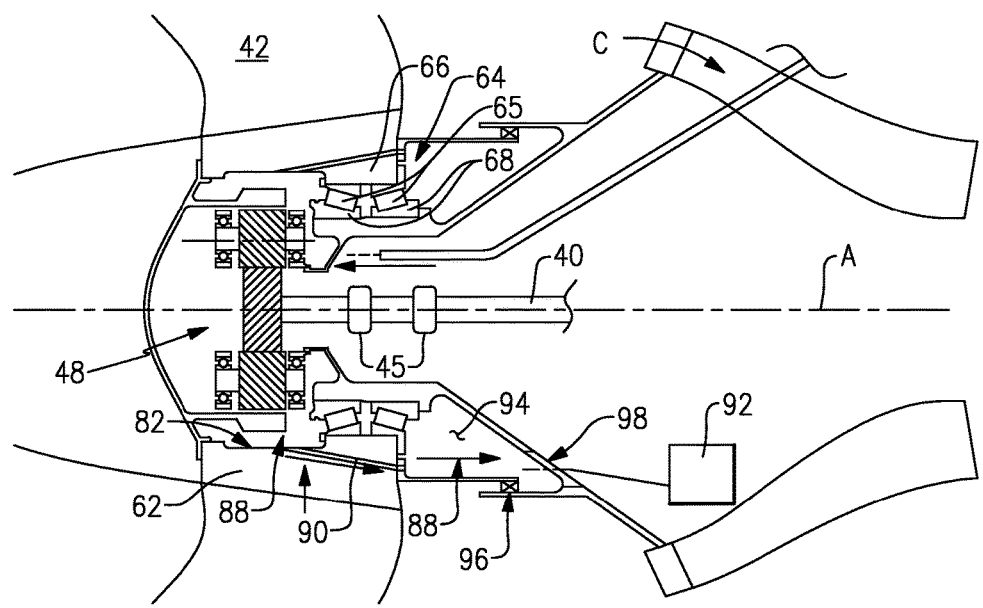
FIG. 3 is an enlarged view of lubricant flow through the fan section of the example gas turbine engine.

Referring to FIG. 3 with continued reference to FIG. 2, the gutter 82 captures lubricant 88 that flung outward from the geared architecture 48. The hub 62 includes passages 90 that direct lubricant flow 88 into an intermediate cavity 94 formed within the static structure 36 of the engine. The intermediate cavity 94 includes an opening 98 that provides for the communication of lubricant 80 to an engine lubricant sump 92. It should be appreciated that the lubricant sump 92 is illustrated schematically and can include other features that accumulate lubricant and circulate that lubricant back to the lubricant system of the gas turbine engine.

Figure 4:
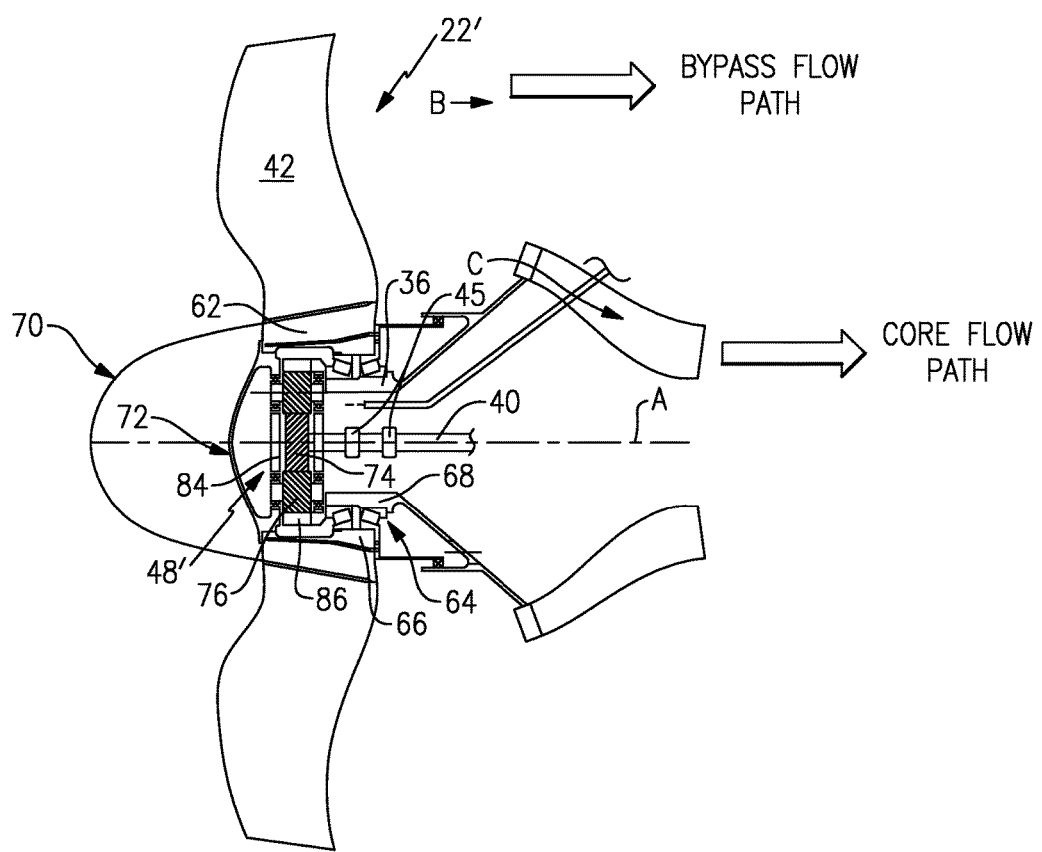
FIG. 4 is another embodiment of a fan section of an example gas turbine engine.

Referring to FIG. 4, another fan section 22' as illustrated includes a geared architecture 48' that is also supported within the hub 62. In this example, the geared architecture 48 comprises a planetary system where a ring gear 86 is fixed to the engine static structure 36 and a carrier 84 that supports rotation of the intermediate gear 76 is fixed to the rotating hub 62. Accordingly, in the example geared architecture 48', the inner shaft 40 drives the sun gear 74 which in turn drives intermediate gears 76. Intermediate gears 76 are supported within the carrier 84. Carrier 84 is in turn fixed to the hub 62 such that rotation of the carrier 84 is transmitted to the hub 62 to rotate the plurality of blades 42 about the axis A. The different configurations of the geared architecture 48 and 48' enable desired gear ratios to drive the fan section 22 at a speed that provides efficient fan operation.

Figure 5:
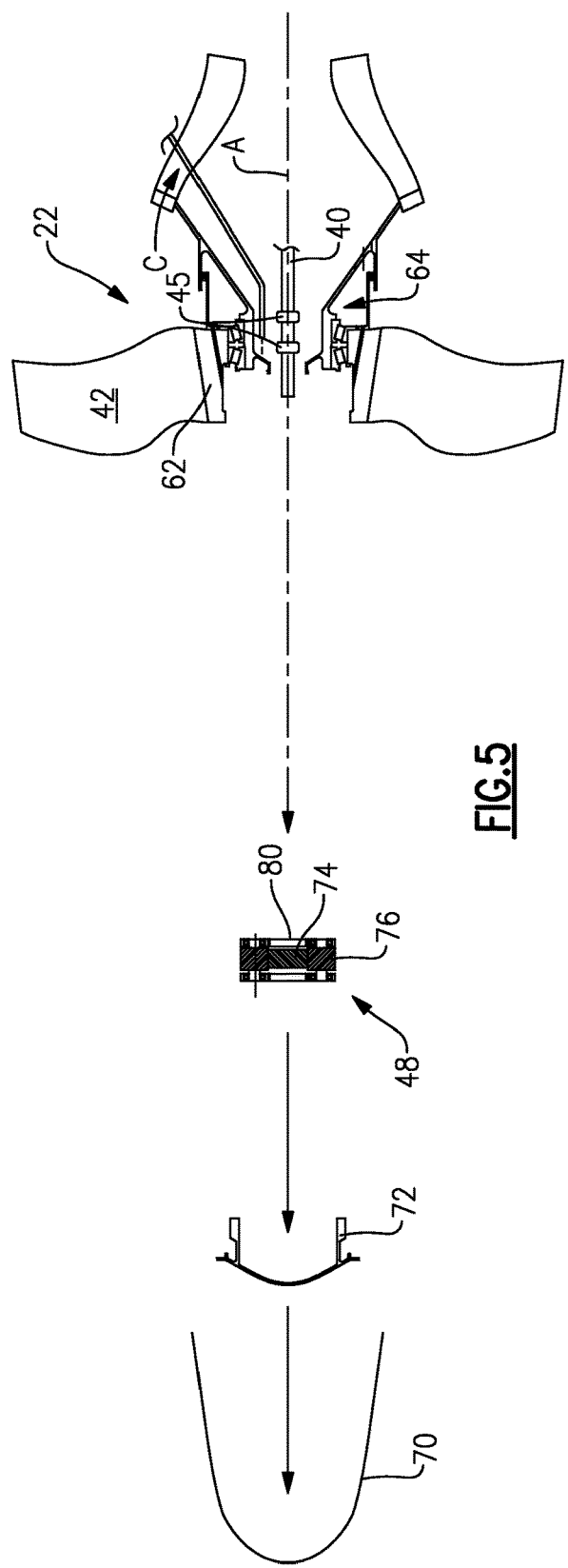
FIG. 5 is a schematic illustration of a disassembly of a geared architecture from the example gas turbine engine.

Referring to FIG. 5, with additional reference to FIG. 2, the example geared architecture 48 is mounted forward of the bearing assembly 64 and is therefore removable without removing additional engine structures. In this example, the geared architecture 48 is accessed by first removing a nose cone 70 and then a cover 72. The nose cone 70 and the cover 72 can be removed from the hub 62 without disturbing other features of the fan section 22. The geared architecture 48 is then decoupled from the inner shaft 40 and is therefore also removable forward through the opening provided upon removal of the cover 72 and the nose cone 70.

The example geared architecture 48, in this example, is decoupled from the ring gear 78 that is formed as a portion connected to the hub 62. The remaining portions of the geared architecture 48 including the sun gear and the carrier 80 are then removed axially forward along the axis A out of the hub 62 without removal of the hub 62 from the engine structure.

The disclosed location of the geared architecture 48 allows for removal without disturbing the fan hub 62 and therefore allows for removal of the geared architecture 48 when the engine is still mounted to an aircraft.

A disclosed method of removal includes removing the nose cone and cover 72 and accessing the geared architecture 48. Once access is obtained through the forward portion of the engine to the geared architecture 48, the geared architecture 48 is decoupled from any fixed structures of the engine. In this example, the carrier 80 is fixed to a static structure 36 of the engine and therefore is decoupled by removing fasteners or other attachment means and devices that fix and secure the carrier 80 to the fixed static structure 36. The remaining portions of the geared architecture 48 are then removed from engagement to the shaft 40 and the ring gear 78. Accordingly, the geared architecture 48 may then be removed from a forward portion of the fan section 22.

Referring to FIG. 4, it should also be understood that the planetary configuration can be removed in essentially the same manner as a star system. In a planetary system, because the carrier is fixed to the hub 62 and the ring gear 86 is fixed to the static structure 36, the removal steps will include decoupling of the carrier 84 from the hub structure 62 and decoupling of the ring gear 86 from the engine static structure 36 to enable access and removal of the gear assembly 48'.

Accordingly, the example geared architecture mounting structure enables access and removal of the geared architecture while the engine is still supported on the aircraft. The ability to access, inspect and remove the geared architecture while the engine is still on the aircraft reduces maintenance and inspection time and, thereby, increases maintenance efficiency and reduces cost.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan section including a hub supporting a plurality of fan blades rotatable about an axis;
   a bearing assembly supporting rotation of the hub about the axis;
   a gas generator including a fan drive turbine; and
   a speed reduction device driven by the fan drive turbine for rotating the fan about the axis, wherein the speed reduction device is mounted radially inward and axially within an axial width of the plurality of fan blades supported by the hub forward of the bearing assembly supporting rotation of the hub.

2. The gas turbine engine as recited in claim 1, wherein the bearing assembly includes an inner race supported by a static structure and an outer race supporting rotation of the hub.

3. The gas turbine engine as recited in claim 2, wherein the outer race is disposed radially outward of the inner race and the hub is directly supported for rotation on the outer race.

4. The gas turbine engine as recited in claim 1, including a rotating gutter disposed radially outside the speed reduction system for collecting lubricant and directing lubricant to a lubricant supply system.

5. The gas turbine engine as recited in claim 1, wherein the speed reduction device is supported within the hub.

6. The gas turbine engine as recited in claim 1, wherein the speed reduction system comprises a star gear system including a ring gear fixed for rotation with the hub.

7. The gas turbine engine as recited in claim 6, wherein the star gear system includes a carrier supporting a plurality of intermediate gears fixed to a static engine structure.

8. The gas turbine engine as recited in claim 1, wherein the speed reduction system comprises a planetary gear system including a carrier supporting a plurality of intermediate gears, wherein the carrier is fixed for rotation with the hub.

9. The gas turbine engine as recited in claim 8, wherein the planetary gear system includes a ring gear circumscribing the intermediate gears, the ring gear fixed to a static engine structure.

10. The gas turbine engine as recited in claim 1, wherein the speed reduction system is removable without removal of the fan section.

11. A method of removing a geared architecture from a gas turbine engine comprising:
    accessing a geared architecture mounted radially inward and axially within an axial width of blades of the fan section supported by a hub and forward of a bearing assembly at least partially supporting the hub of the fan section;
    decoupling a portion of the geared architecture from a fixed engine structure; and
    removing the geared architecture in a direction forward of the fan section.

12. The method as recited in claim 11, including decoupling a portion of the geared architecture from the fan section.

13. The method as recited in claim 12, wherein the step of decoupling the geared architecture includes decoupling a plurality of intermediate gears from a ring gear fixed to the hub.

14. The method as recited in claim 13, wherein decoupling the geared architecture includes decoupling a carrier supporting the plurality of intermediate gears from the fixed engine structure.

15. The method as recited in claim 12, wherein decoupling the geared architecture includes decoupling the carrier supporting the plurality of intermediate gears from the hub.

16. The method as recited in claim 11, including decoupling a sun gear of the geared architecture from a shaft.

17. The method as recited in claim 11, including removing a nose cone attached to a hub of the fan section to provide access to the geared architecture.

18. The method as recited in claim 11, wherein the fan section includes a hub that remains supported by the bearing assembly upon removal of the geared architecture.

19. The method as recited in claim 11, wherein removing of the geared architecture includes moving the geared architecture along the axis forward of the fan section.

\* \* \* \* \*